US011269607B2

United States Patent
Hieser et al.

(10) Patent No.: US 11,269,607 B2
(45) Date of Patent: Mar. 8, 2022

(54) METHOD FOR PROVIDING A MOBILE APPLICATION

(71) Applicant: SCHNEIDER ELECTRIC INDUSTRIES SAS, Rueil-Malmaison (FR)

(72) Inventors: Alexander Hieser, Wertheim (DE); Marcus Zinn, Rodgau (DE)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 16/902,353

(22) Filed: Jun. 16, 2020

(65) Prior Publication Data

US 2020/0401388 A1   Dec. 24, 2020

(30) Foreign Application Priority Data

Jun. 18, 2019   (EP) .................................. 19 181 013

(51) Int. Cl.
*G06F 9/445* (2018.01)
*G06F 8/61* (2018.01)
*H04L 67/00* (2022.01)

(52) U.S. Cl.
CPC ................ *G06F 8/61* (2013.01); *H04L 67/34* (2013.01)

(58) Field of Classification Search
CPC ..................................................... G06F 8/61
USPC ......................................................... 717/177
See application file for complete search history.

(56) References Cited

U.S. PATENT DOCUMENTS

| 9,535,563 B2* | 1/2017 | Hoffberg ............ G06Q 30/0255 |
| 2019/0065217 A1* | 2/2019 | Girdhar ..................... G06F 8/34 |
| 2019/0095196 A1 | 3/2019 | Anderson |

(Continued)

FOREIGN PATENT DOCUMENTS

| DE | 102005037280 A1 | 2/2007 |
| EP | 2662738 A1 | 11/2013 |

OTHER PUBLICATIONS

European Search Report, dated Jan. 8, 2020, corresponding to EP Application No. 19181013.4.

(Continued)

*Primary Examiner* — Evral E Bodden
(74) *Attorney, Agent, or Firm* — Ladas & Parry LLP; Malcolm J. MacDonald

(57) ABSTRACT

A method for generating and providing a mobile application executable on a mobile device, and designed for the configuration, maintenance, diagnosis of data and functions of a data processing device, and coupled to the mobile device via a communication link. The mobile application is hosted in the data processing device and is loaded from the data processing device into the mobile device after the communication link is established, wherein content and/or functions of the application data describing the mobile application are dynamically generated or updated by means of a generation logic implemented in the data processing device on the basis of current data of a configuration and/or a runtime environment of the hosting data processing device, and wherein the generation logic is designed to record data of a configuration and/or runtime environment of further data processing devices coupled to the hosting data processing device via a network.

12 Claims, 5 Drawing Sheets

(56) References Cited

U.S. PATENT DOCUMENTS

Figure 1:
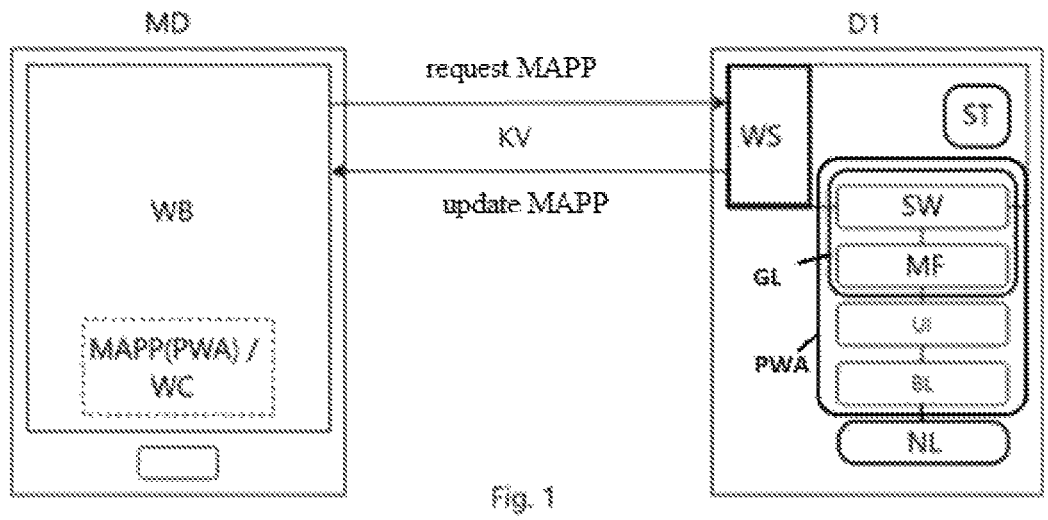

2019/0124401 A1  4/2019 Lentner
2020/0081703 A1  3/2020 Lin

OTHER PUBLICATIONS

Chinese Office Action and Chinese Search Report, dated Mar. 25, 2021, corresponding to Chinese Application No. 202010558381.0.

* cited by examiner

METHOD FOR PROVIDING A MOBILE APPLICATION

The invention relates to a method for generating and providing a mobile application according to the preamble of claim 1.

A method for generating and providing a mobile application is known from EP 2662738 A1. A method and an application for configuring a component of an industrial automation arrangement are described, wherein at least one parameter is input or changed by the configuration of the component. A mobile device is used for configuration, wherein an application configured for configuration is first transferred from one of the components of the automation network to the mobile device, the application is then executed on the mobile device, furthermore a logical connection is established between the mobile device and the component to be configured, and finally the at least one parameter is input or changed by the application of the mobile device by means of the logical connection.

DE 10 2005 037 280 A1 relates to a method for communication of a mobile device with a working device, in which a communication link is established between the mobile device and the working device. An application is loaded from the working device onto the mobile device and the loaded application is executed on the mobile device. Data of the working device are read out and/or modified with the aid of the application.

US 2019/0065217 A1 relates to a system for generating, distributing, and transmitting content of a progressive web application (PWA) on a home screen of a mobile device. The system comprises an interface that is configured to generate one or more PWAs. The system furthermore comprises a remote server configured to host the at least one PWA. The system furthermore comprises a browser-based configuration application implemented on the mobile device, wherein the mobile device comprises a processor configured to execute the steps for providing a browser for a user to be able to access one or more PWAs, be able to receive instructions from the user of the mobile device, configure the PWA on the display of the mobile device, and be able to configure one or more parameters linked to the PWA for an application programming interface (API) on the display of the mobile device, and be able to transmit the content of the PWA to the mobile device.

US 20190095196 A1 relates to a method for updating a web application. The method comprises receiving an application update request for a requested web application from a service web application executed in a web browser on the mobile device.

WO 2019/083909 A1 relates to a system, a device, and a method for producing multimedia gates, for example, improved management of legally protected mobile electronic devices, improved group tool management, and simplified provision of user-owned device content.

According to the prior art, mobile applications for configuration, maintenance, and/or diagnosis of data processing devices are provided in a so-called app store and can be loaded from the app store using a mobile device, such as a smart phone. However, this presumes that the user of the mobile device is registered in the app store and has an authorization to download the mobile application.

In the field of industrial automation, there is often the need to configure, maintain, and/or carry out a diagnosis of a variety of different and highly developed data processing devices of automation technology, for example, programmable controllers (PLCs), drives, sensors, or actuators by means of a mobile device. To carry out these actions, the user is provided with software tools in the form of device-specific mobile applications. The user can load these from an app store onto his mobile device in order to subsequently establish a communication link to the data processing device to carry out the actions.

However, this method is problematic in that the user can load a device-specific mobile application intended for the data processing device from the app store, but it is not ensured that the loaded version actually corresponds to the current firmware of the data processing device to be processed. In the worst case, the user cannot use the mobile application loaded on his mobile device using the data processing device without updating the firmware or downgrading the mobile application.

Regardless of this, there are a variety of different mobile applications in order to be able to operate the various data processing devices such as programmable logic controllers or drives. The user has to install a compatible mobile application on his mobile device to be able to establish a communication and interact with the data processing device. This can unsettle the user, since he has to know which mobile applications he needs for which data processing device. Furthermore, for each application available on the mobile device, an icon is displayed on the user interface of the mobile device, which can become confusing.

In order to load a mobile application from an app store, it is also necessary for the user to be registered for a specific operating system. An internet connection is also required.

Proceeding from this, the present invention is based on the object of refining a method of the type mentioned at the outset in such a way that the provision of a current device-specific mobile application for configuration, maintenance, and diagnosis of a data processing device is simplified.

The object is achieved according to the invention by a method having the features of claim 1.

According to the invention, it is provided that the mobile application can be hosted in the data processing device and loaded by the user directly from the data processing device. The connection to an app store, registration with the app store, and an active internet connection are therefore not necessary. As soon as a user can establish a communication link with the data processing device hosting the application, the latter is capable of loading the mobile application hosted in the data processing device.

Content and/or functions of the application data describing the mobile application are dynamically generated or updated by means of a generation logic implemented in the data processing device on the basis of current data of a configuration and/or a runtime environment of the hosting data processing device.

Consequently, the hosting data processing device is designed to update or change the content or the functions of the hosted mobile application, based on current data of the configuration and the runtime environment of the hosting data processing device.

According to the invention, the generation logic is designed to record data of a configuration and/or a runtime environment from further data processing devices coupled to the hosting data processing device via a network and to generate or update the mobile application on the basis of the data of the hosting data processing device and the recorded data of the further data processing devices.

This procedure provides a mobile application on the mobile device which can interact with a large number of data processing devices connected to the hosting data processing device via a network. The mobile application is enriched using data that is dynamically recorded from the further data processing devices. As a result, the mobile application is dynamically updated using current items of information/data of the various data processing devices, at the time of installation or at the time of provision.

Both the hosting data processing device and the further data processing devices connected to the hosting data processing device via the network are data sources for the mobile application installed on the mobile device.

According to the procedure according to the invention, it is provided that the mobile application is provided in the form of a progressive web application. It should be noted here that the concept of the progressive web application is used as an exemplary but preferred technology for implementing the invention. Regardless, the invention can be implemented and carried out using various technologies and communication protocols.

Providing the progressive web application comprises the following method steps:
  connecting the mobile device to the data processing device hosting the progressive web application,
  generating the application data of the progressive web application by way of the generation logic of the hosting data processing device based on current data of the hosting data processing device and/or the data which are provided by the connected further data processing devices,
  transmitting the generated progressive web application to the mobile device,
  registering the progressive web application by way of the mobile device, and
  installing the progressive web application on the mobile device.

It is provided that generating the application data of the progressive web application PWA is initiated upon an initial coupling between the mobile device and the hosting data processing device, and the update of the application data of the progressive web application is initiated upon each further connection and only one data update is transmitted to the mobile device.

Generating the progressive web application preferably comprises the following method steps:
  generating a manifest to incorporate static attributes such as name, icons, and/or startup Uniform Resource Locator (URL) for the progressive web application
  integrating data of a user interface and a business logic of the hosting data processing device and/or the further data processing devices as application data in the progressive web application
  generating a ServiceWorker of the progressive web application and configuring ServiceWorker events for interaction with the runtime environment of the hosting data processing device.

It is provided that during the generation of the progressive web application by means of the generation logic, a unique identifier is generated using a Media Access Control (MAC) address of a web server of the hosting data processing device and implemented in the progressive web application.

According to a further preferred procedure, it is provided that upon a first connection between the mobile device and a data processing device hosting the progressive web application, an index.html is requested, by means of which a ServiceWorker is registered, and the ServiceWorker is loaded in the mobile device and installed and activated on the mobile device.

As a result, the original "client-server" relationship of a ServiceWorker known per se is expanded. This extension includes, among other things, the generation of a ServiceWorker having a unique ID and the possibility that a connection to the ServiceWorker installed in the connected data processing device is established via the ServiceWorker installed in the mobile device and data is requested, wherein the ServiceWorker of the hosting data processing device is trained is to query ServiceWorkers of the progressive web applications of the connected data processing devices and to integrate them into its own progressive web application. This expansion is novel over the original PWA concept.

The data processing device, for example, an IIOT device, can update the mobile application to take into consideration the most recent data changes in the data processing device or in its environment. The data processing device functions as a data source for the installed mobile application. As a result, the mobile application is brought to the latest state at the time of the installation/provision.

When a user first establishes a connection to a data processing device such as an IIOT device, the generation of a progressive web application is triggered using the latest data available on the data processing device to which the user is connected using his mobile device. Content/data of the progressive web application therefore originate from only one device.

If the data processing device is connected to other data processing devices in the same environment, diagnostic/maintenance data can be recorded from these devices during the generation phase. This results in an updated application that consists of all available data from all connected data processing devices in the environment. The content of the progressive web application comes from multiple data processing devices.

The installed application is a basic framework which can interact with multiple data processing devices such as IIOT devices in the environment and can dynamically improve itself using data which were recorded from the other data processing devices such as IIOT devices. As a result, an update having the current items of information from various data processing devices such as IIOT devices is carried out at the installation/provision time.

Multiple update events are possible due to the multiple endpoints. In the event of available updates, an update event is started, wherein the ServiceWorker loads the updates into the mobile device and installs them therein.

The data can be recorded from the data processing device itself or from other entities, for example, a global registration service.

Further details, advantages, and features of the invention result not only from the claims and the features to be inferred therefrom—alone and/or in combination—but rather also from the following description of preferred exemplary embodiments to be inferred from the figures.

Figure 2:
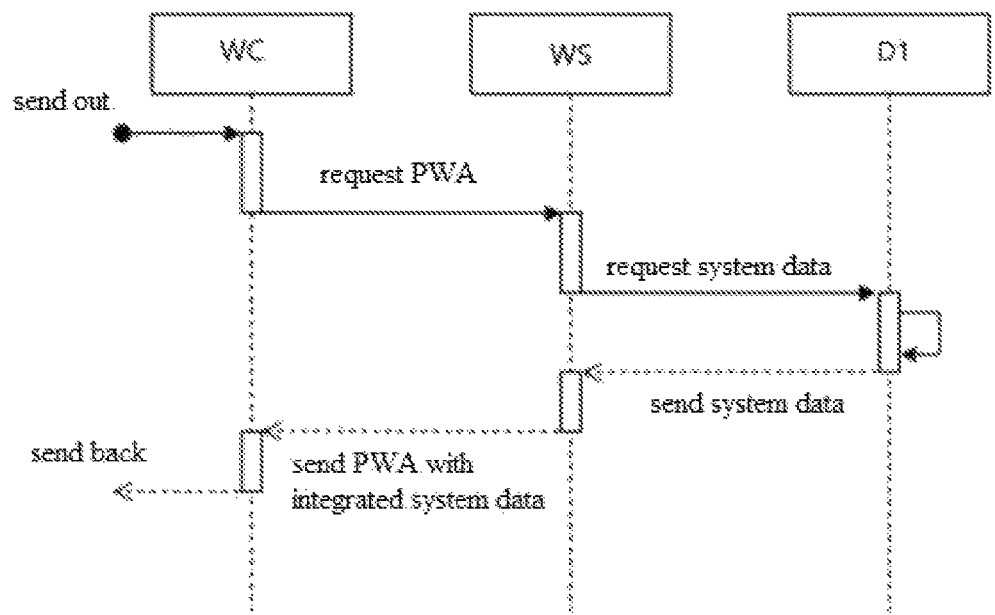
Figure 3:
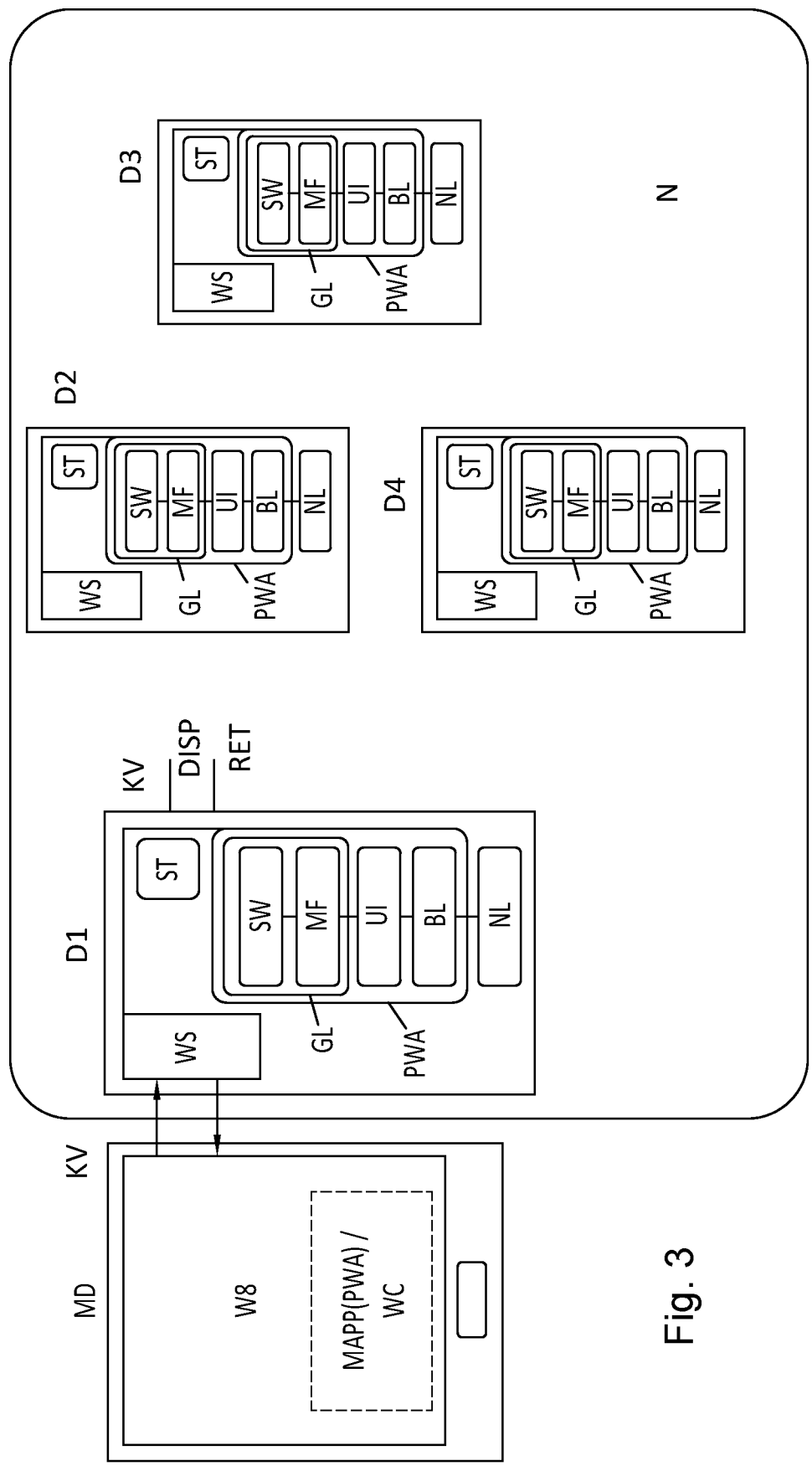
Figure 4:
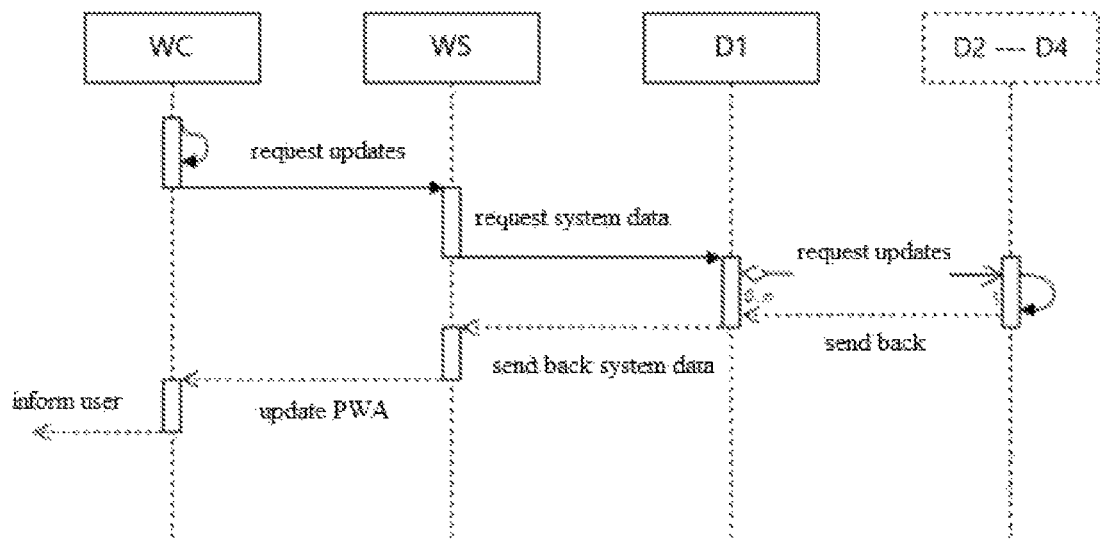
Figure 5:
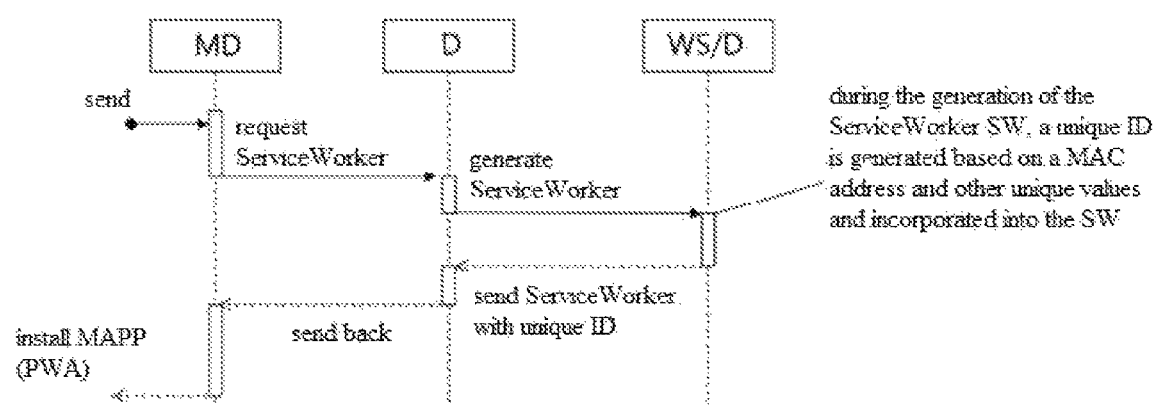
Figure 6:
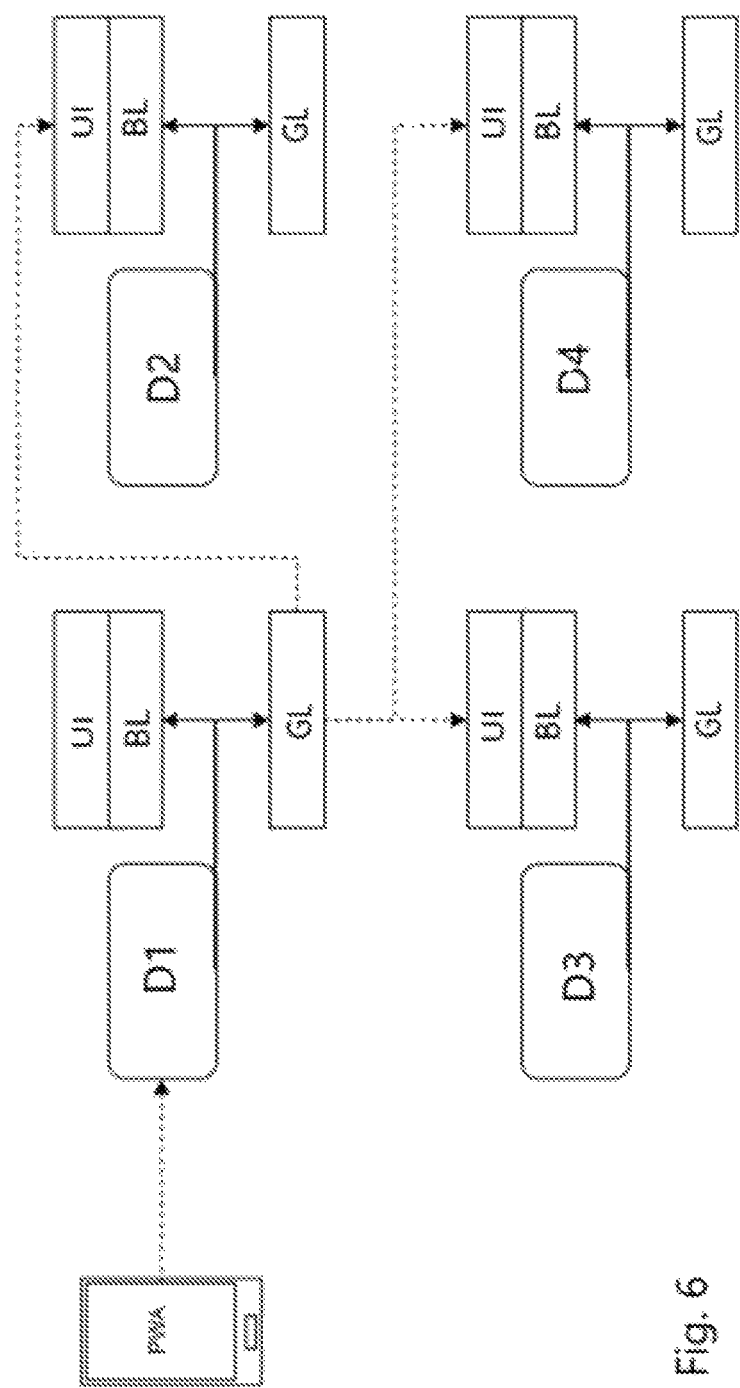
Figure 7:
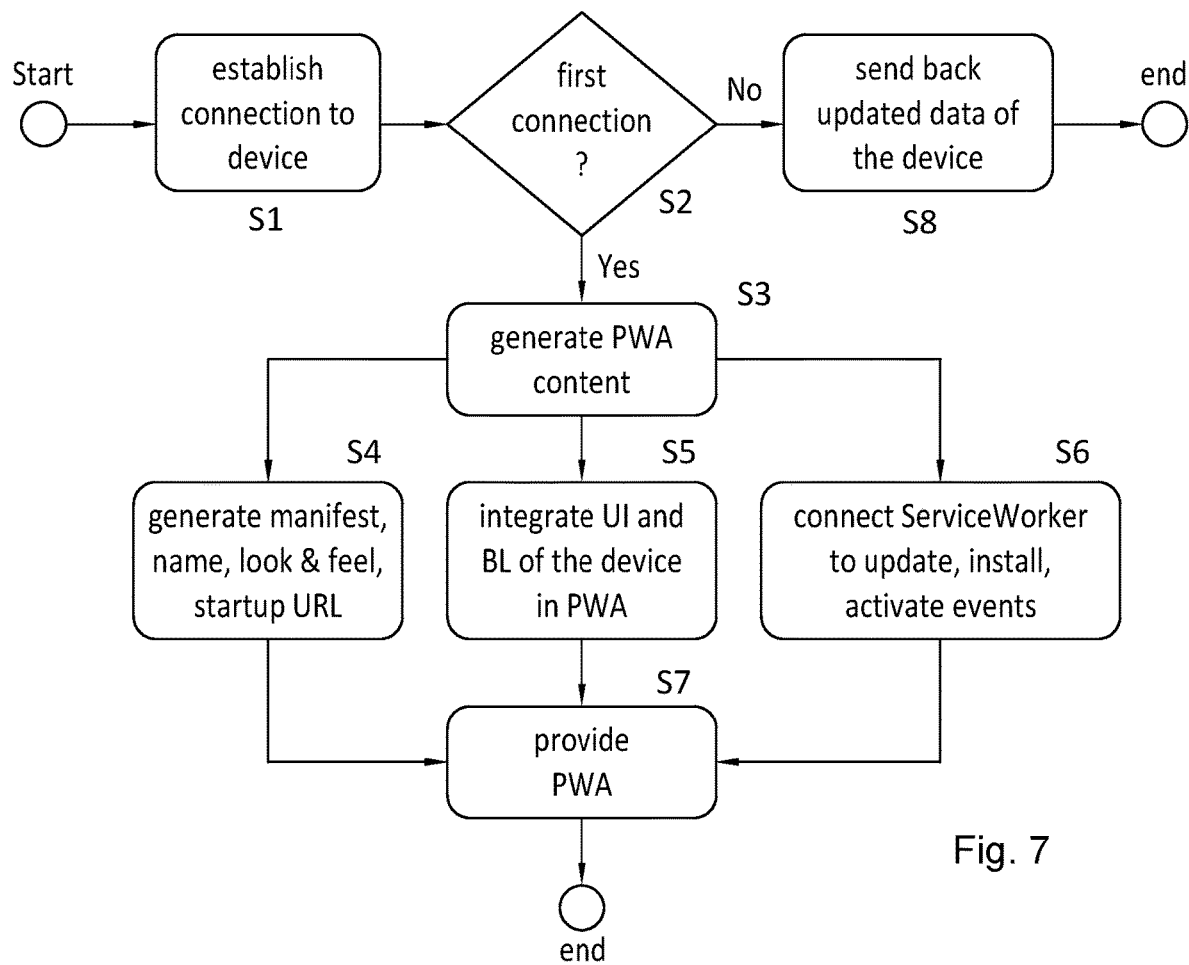
Figure 8:
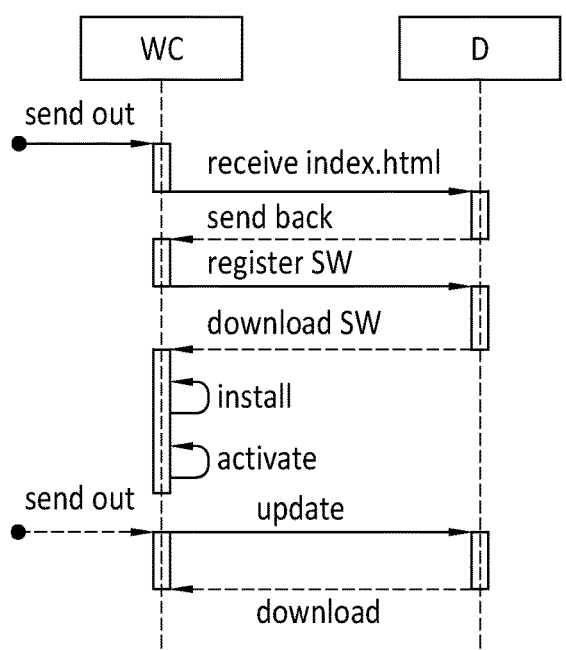

In the figures:

FIG. 1 shows a schematic illustration of a data processing device for providing a mobile application for a mobile device;

FIG. 2 shows a communication sequence between the mobile device and the data processing device according to FIG. 1, FIG. 3 shows a plurality of data processing devices arranged in a network for providing a mobile (master) application by way of a master device for the mobile device, FIG. 4 shows a communication sequence between the mobile device and the master device according to FIG. 3, FIG. 5 shows a communication sequence for identifying the origin of the mobile application, FIG. 6 shows a schematic illustration of the network according to FIG. 3 having data sources for generating the shared mobile (master) application, FIG. 7 shows a schematic flow chart for generating a mobile application, and FIG. 8 shows a communication sequence between the mobile device and one of the data processing devices for downloading and activating a ServiceWorker.

FIG. 1 shows, solely schematically, a mobile device MD, for example, a smart phone, which is connectable via a communication link KV, e.g., Wireless Fidelity (Wi-Fi), Bluetooth, or NFC (near field communication) to a data processing device Dl, e.g., a programmable controller, a drive, a sensor, and/or an actuator.

It is provided according to the invention that that a mobile application MAPP is provided in the data processing device D1, which can be loaded by a user into the mobile device MD after establishing the communication link KV in order, for example, to configure, maintain, or carry out a diagnosis of the data processing device Dl. The communication link can be designed as a Wi-Fi, Bluetooth, or NFC connection, so that neither the mobile device MP nor the data processing device D1 has to be connected to the Internet.

Since the device-specific mobile application can be loaded directly from the data processing device D1, there is no need for the user to have to load the mobile application in advance from an app store or for a connection to the Internet to exist. The mobile application MAPP provided by the data processing device D1 is continuously updated by the data processing device D1 and is therefore always fully compatible, so that different software versions between the mobile application and the data processing device D1 to be controlled are excluded. Another advantage is that registration with an app store is not necessary.

The data processing device D1 is designed to generate the mobile application MAPP and to update it in running operation in order to reflect changes of configuration data or data of a runtime environment of the data processing device D1. Consequently, the data processing device D1 acts as a data source for the hosted mobile application, so that the mobile application MAPP is always up to date at the time of installation or at the time of provision.

According to the invention, a web server WS, a memory ST, a network logic NL, and an application in the form of a progressive web application PWA having user interface files UI, control logic files BL, and files of a generation logic GL having ServiceWorker SW and manifest MF are implemented in the data processing device D1.

The generation logic GL is designed to request current data of the user interface files UI or the control logic files BL in order to generate the mobile application MAPP or update it after a data change.

According to the exemplary embodiment shown, the invention is based on the concept of the progressive web application PWA. However, the use of PWAs is described purely by way of example, without restricting the subject matter of the invention; because the generation logic GL can be implemented using different technologies and different communication protocols.

The mobile device MD comprises at least one web client WC and a web browser WB, via which the web server WS of the data processing device D1 can be called up by means of the communication link KV.

The method according to the invention is explained hereinafter, but not restrictively, on the basis of the technology known per se of a progressive web application PWA.

A progressive web application PWA is a website that has numerous features which were previously reserved for native apps. It can therefore also be described as a symbiosis of a responsive website and an app. The progressive web application PWA can be created like a website using HyperText Markup Language (HTML) 5, Cascading Style Sheets (CSS) 3 and JavaScript; in addition, so-called ServiceWorkers SW are used for optimized caching of the off-line functionalities. For example, the HyperText Transfer Protocol Secure (HTTPS) protocol can be used for communication between a web client WC of the mobile device MD and a web server WS of the data processing device Dl.

The progressive web application PWA is started in that, for example, a URL of the web server WS is input into the web browser WB of the mobile device MD and thus a first request is transmitted. The web server WS accepts the request and forwards it to the PWA, which functions as a web application. This generates or loads an HTML source code of a website, which is sent back from the web server to the browser (HTTPS response).

The user sees a website that is adapted to the mobile device due to the responsive design. Although the progressive web application PWA was accessed via a URL, the user can see an icon on the display screen of the mobile device such as a smartphone or receive push notifications and also use the site offline. The technology based on progressive enhancement is intended to offer users the best possible user experience depending on the devices used.

A ServiceWorker SW is a JavaScript that the web browser WB executes in the background. It provides essential functions such as caching for off-line usability for progressive web applications PWA. Once accessed online, content can also be displayed without Internet connection during the next visit to the site (off-line mode). Push notifications known from native apps are also possible with ServiceWorkers SW. The ServiceWorker SW are specially programmed, registered in the JavaScript of the site, and installed. ServiceWorkers SW operate HTTPS, which is why every progressive web app runs with HTTPS. A connection via an unsecured HTTP connection is not possible.

FIG. 2 shows an initial communication sequence between the web client WC of the mobile device MD and the web server WS of the data processing device Dl. In a first step, the web server WS is accessed via a request of the web client WC of the mobile device MD. A request "request PWA" is sent to the web server WS via the web client WC. The generation logic GL retrieves current system data from the memory module SM based on the current runtime environment and the current status of the data processing device, which are integrated into the progressive web application PWA by means of the generation logic GL. The progressive web application having the integrated system data is transmitted from the web server WS to the web client WC of the mobile device MD.

The mobile device MD registers the progressive web application PWA and the user can install the PWA on the mobile device.

After the installation, all the files required for executing the progressive web application PWA are available in the mobile device MD without a connection to the data processing device D1 being necessary.

When the mobile device MD is reconnected to the same data processing device D1, the data of the data processing device D1 are automatically updated and consequently also the progressive web application PWA.

In other words, the progressive web application PWA hosted in the data processing device is dynamically generated.

FIG. 3 shows a schematic illustration of a network N having a plurality of data processing devices D1 . . . D4, which are communicatively coupled.

According to an alternative embodiment of the method according to the invention, it is provided that the generation logic GL implemented in the data processing device D1 is designed to generate a progressive web application PWA in which both system data of the hosting data processing device D1 and system data of the further data processing devices D2 . . . D4 connected to the data processing device D1 are integrated.

The mobile device MD is connected via the communication link KV to the data processing device D1, which is referred to hereinafter as the master device D1. As soon as the system data or the configuration data of a data processing device D1 . . . D4 connected to the network N change, the data changes are recorded by the generation logic GL of the master device D1 via a data communication transmission DISP/reception RET, so that the progressive web application PWA is updated automatically. If all the data processing devices D1 . . . D4 connected to the network N comprise a generation logic GL according to the invention, it is irrelevant for a user to which data processing device D1 . . . D4 the mobile device MD connects, since each data processing device has the capability of detecting other data processing devices connected in the same network and integrating their data into the progressive web application PWA. An updated application is therefore always made available by the master device D1 at the installation or deployment time.

FIG. 4 shows a communication sequence between the mobile device MD and the further data processing devices D1 . . . D4.

If a user accesses the web server WS of the master device D1 via the web client WC of the mobile device MD, updates are requested. The web server WS requests system data of the master device D1. The data processing devices D2 . . . D4 are queried for updates via a network logic NL and they are sent back to the master device D1.

The current system data are processed in the generation logic GL to generate a current progressive web application PWA. The current system data are sent back via the web server WS to the web client WC of the mobile device to update the progressive web application PWA already installed in the mobile device and can be displayed and processed.

Consequently, an updated mobile application is always provided by the master device D1, which comprises all available system data of the data processing devices present in the network.

The progressive web application PWA thus contains data from a large number of devices in the network N. The data can be recorded by the master device D1 itself or by other entities, for example, a global register service.

The files for the progressive web application PWA are transmitted to the mobile device MD, for example, via the HTTPS protocol. When all the necessary files have been transmitted, the web browser WB implemented in the mobile device MD is able to recognize that a progressive web application PWA is currently being displayed and offers the user the local installation of the progressive web application PWA.

After installation, the mobile device MD has all the files necessary to run the progressive web application, without a connection to a data processing device D1 . . . D4 und/oder without a connection to the internet. If a connection is subsequently established to one of the data processing devices D1 . . . D4, the data of the progressive web application PWA on the mobile device will be updated automatically.

FIG. 5 shows, purely schematically, a communication sequence between the mobile device MD and one of the data processing devices D1 . . . D4 for determining the origin of the data. During the installation/generation, a unique indicator Identification (ID) is generated using, for example, the MAC address of the Web server WS and possibly further parameters such as timestamp, geolocation, and/or unique ID SW. The unique indicator ID can be used to identify the origin of the mobile application and to handle it accordingly, e.g., use, warning, blocking, or reinstallation.

The ServiceWorker SW controls the reinstallation of the progressive web application PWA or the update of some content of the progressive web application PWA on the basis of the downloaded data.

The ServiceWorker SW is a very important component of the progressive web application PWA. The ServiceWorker SW implements the logic for offline use and the update behavior. Without a ServiceWorker SW, a progressive web application PWA cannot be installed. Since the ServiceWorker SW runs independently of the actual progressive web application PWA, it enables updates in the background, the receipt of push messages, and/or installing a progressive web application PWA on the mobile device MD. The ServiceWorker SW acts as a "proxy" server between the actual progressive web application PWA and the data processing device such as the IIoT (Industrial Internet of Things) device.

The sequence according to FIG. 5 can also be applied to the communication between the master device, which is coupled to the mobile device, and the data processing devices connected to the master device.

According to an inventive concept, a ServiceWorker SW takes on the role of a terminal and the progressive web application PWA of one of the data processing devices is installed in the ServiceWorker SW. The ServiceWorker SW with the progressive web application PWA installed then receives the updates from the ServiceWorker SW whose progressive web application PWA it has requested. The ServiceWorker SW then passes on the updates accepted in it to terminals, for example, mobile devices or other ServiceWorkers, until the mobile device used by the user is reached.

FIG. 6 shows, solely schematically, the network N according to FIG. 3 for generating a mobile application as a master application in the data processing device D1 using all the data of the connected data processing devices D1 . . . D4.

Each of the data processing devices D1 . . . D4 has a generation logic GL, i.e., ServiceWorker SW und/oder manifest MF, to generate a mobile application in the form of a progressive web application PWA. Furthermore, each of the data processing devices D1 . . . D4 has specific user interface files UI and control logic files BI as a device-specific data set.

If a data processing device is not the master device D1, it can record the user interface files UI or control logic files BL from other devices in order to include the data in the generated progressive web application PWA.

FIG. 7 shows a method sequence for generating and providing the progressive web application PWA.

After the start, in a step S1, the connection of the mobile device MD to one of the data processing devices D1 . . . D4 is established.

In a step S2, a query is made as to whether the connection is the first connection to the data processing device. If so, the generation of the progressive web application PWA is carried out in a step S3.

In a step S4, a manifest is generated, which contains static attributes such as the names, the icons, and the start URL of the progressive web application. The manifest is generated only once and integrated in a file "index.html" of the progressive web application PWA.

In a step S5, the user interface files UI and the control logic files BL are integrated into the progressive web application PWA.

In a step S6, the ServiceWorker is generated and the ServiceWorker events are configured to be able to work with the runtime environment of the data processing device.

In a step S7, the generated progressive web application PWA is provided.

If the connection of the mobile device MD to one of the data processing devices D1 ... D4 is not the first connection, only a data update is carried out and the updated progressive web application PWA is sent back to the mobile device MD in step S8.

FIG. 8 shows a communication sequence between the web client WC of the mobile device MD and one of the data processing devices, in particular the data processing device D1. By sending a request, the "index.html" of the progressive web application PWA is requested upon the first connection. The "index.html" is sent back to the web client WC and then the ServiceWorker is registered by the data processing device D1. In a further step, the ServiceWorker is loaded into the mobile device MD and installed on the mobile device MD. After installation, it is activated.

If updates are available, an "update event" is started and the updates are loaded and installed by means of the ServiceWorker.

The following advantages are achieved by the method according to the invention:
  Instead of a large number of mobile applications on the mobile device, only a single mobile application is generated.
  When a data processing device changes the content of the hosted progressive web application, the mobile (master) application installed in the mobile device is updated automatically.
  There is no control over the mobile applications by third-party providers of app stores.
  If one of the data processing devices is defective, the mobile (master) application can be generated or provided (maintained) by another device.
  The mobile (master) application is always in compliance with the application validity rules.
  The mobile (master) application can run on various platforms such as iOS, Linux, Windows, or Android.
  The system described can be expanded to consumer devices, e.g., televisions, refrigerators, photo cameras.

The invention claimed is:

1. A method for the generation and provision of a mobile application to be loaded in a mobile device, wherein the mobile application executable on the mobile device is designed for the configuration, maintenance, or diagnosis of data or functions of a data processing device which can be coupled to the mobile device via a communication link, wherein the mobile application is hosted in the data processing device and is loaded from the data processing device into the mobile device after the communication link is established, wherein content or functions of the application data describing the mobile application are dynamically generated or updated by means of a generation logic implemented in the data processing device on the basis of current data of a configuration or a runtime environment of the hosting data processing device, and wherein the generation logic is designed to record data of a configuration or runtime environment of further data processing devices coupled to the hosting data processing device via a network,
  wherein a generation logic is implemented in each of the data processing devices, which is designed to generate a progressive web application providing the mobile application, wherein the data processing device connected to the mobile device via the communication link takes over the function of a master device, wherein changes of the system or configuration data of the data processing devices connected via the network are recorded via a data communication by means of the generation logic of the master device, so that the progressive web application of the master device is automatically updated, and wherein the mobile application is generated or updated on the basis of the data of the master device and the recorded data of the connected data processing devices.

2. The method according to claim 1, wherein the provision of the progressive web application comprises the following method steps:
  connecting the mobile device to the data processing device hosting the progressive web application as a master device,
  generating the application data of the progressive web application by way of the generation logic of the master device based on current data of the master device and the recorded data of the connected further data processing devices,
  sending the generated application data or the generated progressive web application to the mobile device,
  registering the progressive web application by way of the mobile device, and
  installing the progressive web application on the mobile device.

3. The method according to claim 1, wherein the generation of the application data of the progressive web application is triggered upon a first coupling between the mobile device and one of the data processing devices, and wherein the update of the application data of the progressive web application is triggered upon each further connection.

4. The method according to claim 1, wherein the generation of the progressive web application comprises the following method steps:
  the generation of a manifest to incorporate static attributes;
  the integration of data of a user interface and a business logic of the master device or the further data processing devices as application data in the progressive web application; and
  the generation of a ServiceWorker of the progressive web application and configuring ServiceWorker events for interaction with the runtime environment of the master device.

5. The method according to claim 4, wherein, during the generation of the progressive web application by means of the generation logic, a unique identifier is generated using a Media Access Control (MAC) address.

6. The method according to claim 1, wherein, upon a first connection between the mobile device and the data processing device hosting the progressive web application, an index.html is requested, by means of which, a Service- Worker is registered, and wherein the ServiceWorker is loaded in the mobile device and installed and activated on the mobile device.

7. The method according to claim 6, wherein, in the event of available updates, an update event is started, and wherein the ServiceWorker loads the updates into the mobile device and installs them therein.

8. The method according to claim 1, wherein the installed application interacts with multiple data processing devices in the network environment and dynamically updates itself by way of data which are recorded from other connected data processing devices.

9. The method according to claim 1, wherein the data are recorded in the form of diagnostic/maintenance data during a generation phase from the connected data processing devices.

10. The method according to claim 1, wherein the data processing device is a programmable controller, a drive, an actuator, or a sensor.

11. The method according to claim 4, wherein the static attributes are selected from at least one of a name, an icon, and a startup Uniform Resource Locator (URL) for the progressive web application.

12. The method according to claim 5, wherein the unique identifier is further generated using at least one of a timestamp, a geolocation, and a unique identification of a web server of the master device and implemented in the progressive web application.

* * * * *